March 18, 1958 J. P. ECKERT, JR 2,827,573

QUARTER ADDER

Filed Dec. 10, 1954

INVENTOR

JOHN PRESPER ECKERT, JR.

BY *[signature]*

ATTORNEY

United States Patent Office 2,827,573

Patented Mar. 18, 1958

2,827,573

QUARTER ADDER

John Presper Eckert, Jr., Philadelphia, Pa., assignor, by mesne assignments, to Sperry Rand Corporation, New York, N. Y., a corporation of Delaware Application December 10, 1954, Serial No. 474,536

17 Claims. (Cl. 307—88)

The present invention relates to computing apparatuses and is more particularly concerned with devices capable of performing quarter addition in binary digital applications. In particular, the present invention relates to circuits which may be employed either alone, or in combination with other devices such as magnetic amplifiers or pulse transformers, to effect quarter addition.

The mathematical process known as quarter addition may be understood by referring, for instance, to the following truth table:

| Input A | Input B | Output |
|---|---|---|
| 1 | 1 | 0 |
| 0 | 0 | 0 |
| 1 | 0 | 1 |
| 0 | 1 | 1 |

As will be seen from an examination of the above table, and considering that "Input A" and "Input B" represent electrical signals, the presence of one or the other, but not both, of two input signals effects an output signal while simultaneity of either the presence or absence of the said two input signals results in there being no output signal.

Units capable of performing quarter addition in accordance with the preceding truth table form a basic portion of more complex computation devices. In the past, such quarter adders have utilized vacuum tube circuitry for the most part and have accordingly been subject to the disadvantages that they are relatively fragile in configuration and are subject to operating failures. The present invention serves to obviate the foregoing difficulties.

It is accordingly an object of the present invention to provide improved quarter adders for use in computing applications.

A further object of the present invention resides in the provision of an improved quarter adder device which is more rugged in construction and which is less subject to operating failures than has been the case heretofore.

Still another object of the present invention resides in the provision of an improved circuit which may be employed, per se, to effect quarter addition.

Still another object of the present invention resides in the provision of an improved input circuit for pulse transformers whereby binary quarter addition may be performed.

Another object of the present invention resides in the provision of an improved input circuit for magnetic amplifiers either of the pulse type or of the carrier type whereby the mathematical process known as quarter addition may be readily performed.

A still further object of the present invention resides in the provision of devices which are selectively responsive to the simultaneity or lack thereof of two input signals whereby a characteristic output signal may be selectively obtained in accordance with the principles of quarter addition.

In effecting the foregoing objects and advantages, an improved quarter adder circuit is provided comprising in combination a pair of buffed inputs coupled respectively to one end of a load impedance and also coupled to the inputs of a gating device, the output of the said gating device being coupled to the other end of the said load impedance. The load impedance may comprise an output impedance coupled to the said inputs and to the output of the said gating device, an output signal being taken directly from said output impedance, or it may in the alternative comprise a signal winding carried by a core of magnetic material in a magnetic amplifier device. The load impedance may further comprise the primary winding of a pulse transformer; each of these possible configurations will be discussed in greater detail subsequently.

In the operation of the device, in accordance with the present invention, the presence of one only of two input signals causes one end only of the said load impedance to be raised in potential whereby a current is caused to pass through the said load impedance thereby to effect an output. Simultaneity in either the presence or absence of the said two input signals causes opposite ends of the load impedance to be at substantially the same potential, whereby a resultant signal current is prevented from flowing through the said load and no output is obtained therefrom. By this arrangement therefore the device of the present invention operates in accordance with the principles set forth in the truth table given above, and acts effectively as a quarter adder.

The foregoing objects, advantages, construction and operation of the present invention will become more readily apparent from the following description and accompanying drawings, in which.

Figures 1, 2:
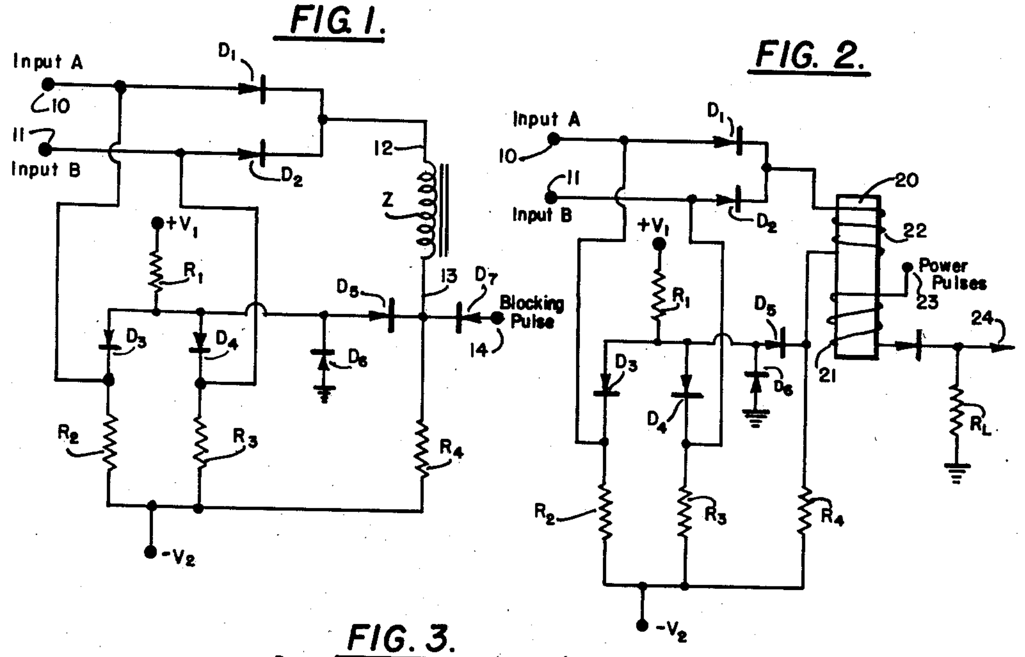
Figure 1 is a schematic diagram of a quarter adder in accordance with the present invention.
Figure 2 is a further schematic diagram of a modification in accordance with the present invention comprising an input circuit cooperating with a magnetic amplifier device for performing quarter addition.

Referring now to the arrangement shown in Figure 1, it will be seen that a quarter adder in accordance with the present invention may comprise a pair of input terminals 10 and 11, to which terminals are respectively coupled selective signal pulses termed "Input A" and "Input B." For purposes of the present discussion, the signals are assumed to be positive going in nature, but it should be understood that the circuits to be discussed may be adapted for use with negative going signals by reversing the load connections, the diodes, and by changing the polarities of the several voltage sources to be discussed.

In the particular embodiment shown, the Input A terminal 10 is coupled via a diode D1 to one end 12 of a load Z, and the Input B terminal 11 is similarly coupled via a diode D2 to the same end 12 of the said load Z. A gating device is also provided and, in the particular configuration shown, comprises a pair of diodes D3 and D4 having their anodes coupled to one another and, via a resistance R1, to a source of positive potential +V1. The said coupled anodes of diodes D3 and D4 are further coupled to the cathode of a further diode D6, the anode of which is connected to ground. Diodes D3 and D4 have their cathodes coupled via resistors R2 and R3, respectively, to a source of negative potential —V2. The Input A and Input B terminals 10 and 11 are coupled respectively to the cathodes of diodes D3 and D4 and act as inputs to the gating device described, and the output of the said gating device is taken via a further diode D5 and is applied to the lower end 13 of the impedance Z. It must be understood that, while the particular gating device shown comprises a preferred embodiment of the present invention, other forms of gates known in the art may also be readily employed in accordance with the principles to be discussed.

The lower end of load impedance Z is further coupled via a resistor R4 to the source of negative potential —V2. If desired, a source of blocking pulses 14 may be coupled selectively via a diode D7 to the lower end 13 of the said impedance Z, as will be discussed. The load impedance Z has been depicted, in the particular arrangement of Figure 1, as an inductive reactance. It must be understood that, as so shown, the said impedance may comprise an input winding of a magnetic amplifier, of either the carrier type or of the pulse type, or may in fact be representative of the primary winding of a pulse transformer. Each of these modifications is meant to fall within the scope of the present invention. Other arrangements will be further suggested to those skilled in the art and the impedance Z may in fact represent the input to any device, such as a conventional amplifier, a further gate, a bistable device, an indicator, etc., which is selectively responsive to the presence or absence of an input pulse.

Figures 3, 4, 5:
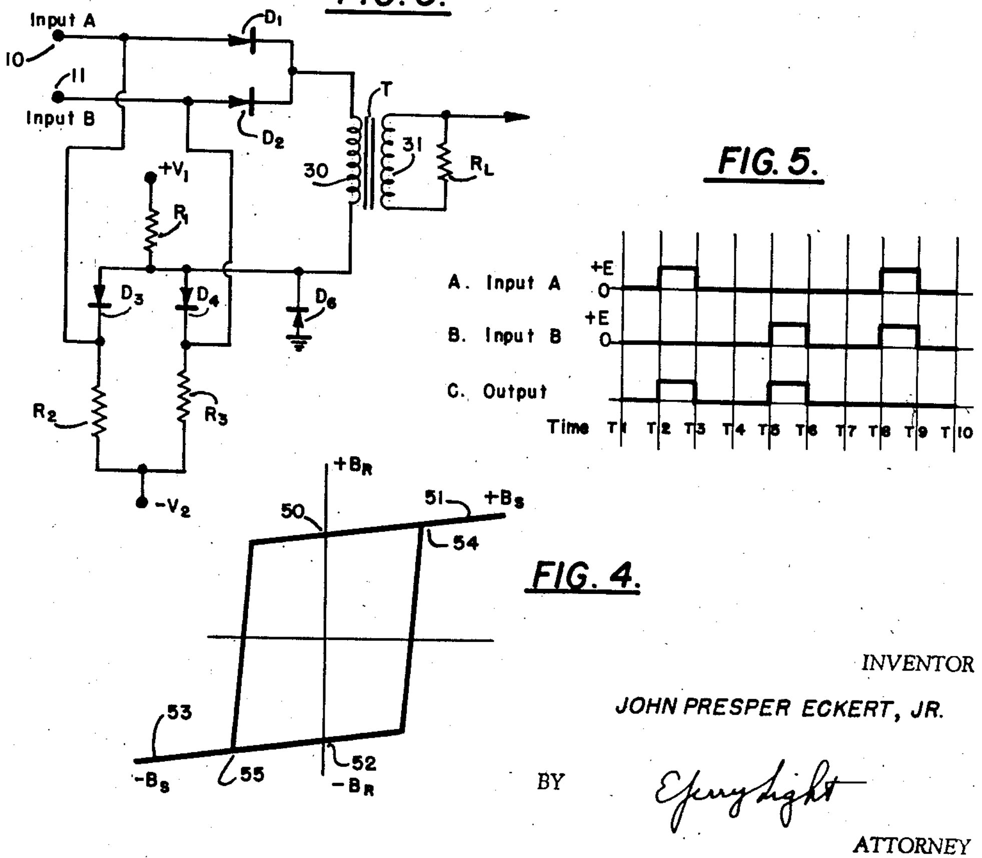
Figure 3 is a schematic diagram of still another modification of the present invention comprising an input circuit employed in conjunction with a pulse transformer for effecting the process of quarter addition.
Figure 4 is an idealized hysteresis loop of a magnetic material which may be preferably employed in the cores of magnetic amplifiers such as may be utilized in the practice of the present invention.
Figure 5 (A through C inclusive) are waveforms depicting the operation of a quarter adder in accordance with the present invention.

Referring now to the arrangement of Figure 1, and making particular reference to the waveforms shown in Figure 5, it will be seen that if we should assume that turing a time interval *t2* to *t3* an Input A pulse should be applied to the terminal 10, the pulse so applied will cause a current to flow via the diode D1 to the upper end 12 of the load impedance Z thereby raising the potential of the said upper end 12 of the said impedance. The Input A pulse will further be coupled to the upper end of the resistor R2 raising the potential thereof at the same time that the upper end of the impedance Z is similarly raised. The resistor R3 is designed to conduct sufficient current from the +V1 source, via resistor R1 and diode D4 to the source of negative potential —V2, however, so that by virtue of the action of clamp diode D6, the lower end of resistor R1, corresponding to the anodes of the diodes D3 and D4, is held at ground potential. A further current flows from ground via the diodes D6 and D5 and resistor R4 to the said source of negative potential —V2, which current also maintains the lower end 13 of the impedance Z at ground potential and, as a result, the Input A pulse applied to the upper end of resistor R2 will not effect any output pulse via the diode D5 to the lower end 13 of the impedance Z. By the arrangement shown therefore the application of an Input A pulse at the terminal 10 will cause a current to flow through the impedance Z whereby an output signal may be obtained therefrom.

If, by a similar analogy, an Input B pulse should be applied to the terminal 11, for example, during a time interval *t5* to *t6*, the said Input B pulse will cause a further current to pass via the diode D2, again raising the potential of the upper end 12 of the impedance Z, but once more the said Input B pulse coupled to the cathode of diode D4 will not effect an output pulse from the gating device shown, via the diode D5, inasmuch as the resistor R2 will still draw sufficient current via the resistor R1 to maintain the anodes of the diodes D3, D4 and D5 at substantially ground potential, by virtue of the diode D6.

If, however, positive going pulses should be applied simultaneously to both the Input A and Input B terminals 10 and 11, for example during the time *t8* to *t9*, current will, as before, pass via the diodes D1 and D2, raising the potential of the upper end 12 of the impedance Z in the manner discussed previously. However, the applied pulses will further be coupled to the cathodes of each of the diodes D3 and D4 in the gating device shown, whereby the said diodes D3 and D4 will be brought substantially to cut-off. Current will therefore flow from the source of positive potential +V1 via the resistor R1, diode D5 and resistor R4 to the source of negative potential —V2, and this current flow will cause the lower end 13 of the load impedance Z to be raised to substantially the same potential as that of the upper end 12 of the said load impedance. By this arrangement, therefore, the simultaneous application of Input A and Input B pulses will cause there to be substantially no resultant signal current flow through the impedance Z whereby no output may be obtained therefrom.

Similarly, if no Input A or Input B pulses are applied to the terminals 10 and 11 there will be no current flow via the diodes D1 and D2, nor will there be an output from the gating device via the diode D5, and again the ends 12 and 13 of the impedance Z will be at the same potential whereby no output is obtained therefrom.

Summarizing the foregoing therefore, it will be seen that the application of one only of the Input A or Input B pulses will effect an output pulse across the impedance Z, while the simultaneous presence or absence of pulses at each of the terminals 10 and 11 will cause no output to appear across the said impedance Z. The device therefore acts in accordance with the truth table given previously, and may be utilized to perform the process of quarter addition.

It is sometimes desired, for instance in various magnetic amplifier circuits, to open the external circuit to both A and B pulses; and to permit such operation the device of the present invention may include a source 14 of blocking pulses, preferably of amplitude greater than the amplitude of the input pulses, selectively coupled via the diode D7 to the lower end 13 of the impedance Z. The application of a positive going blocking pulse, or of a positive D. C. potential, from the said source 14 will raise the potential of the lower end 13 of the impedance Z to substantially the potential of the blocking pulse or blocking potential, whereby the diodes D1 and D2 will each be biased to cut-off, thereby opening the circuit to Input A or Input B pulses. In a modified form of the device shown in Figure 1, the said source of blocking potential 14 may be coupled via a resistor to the lower end 13 of the said impedance Z rather than by the diode D7, and such an arrangement will once more permit a positive voltage to be applied selectviely to the said lower end 13 of the impedance Z, thereby to open the circuit to Input A and Input B pulses.

The arrangement of Figure 2 shows a further modified form of the present invention, particularly as it may be employed in conjunction with a magnetic amplifier. Reference is made to the copending applications of Theodore H. Bonn and Robert D. Torrey, Serial No. 402,858, filed January 8, 1954, for "Signal Translating Device"; and to the copending application of John Presper Eckert, Jr. and Theodore H. Bonn, Serial No. 382,180, filed September 24, 1953, for "Signal Translating Device." These copending applications have each been assigned to the assignee of the instant application, and they each disclose both complementing and non-complementing magnetic amplifier circuits of both the series and parallel type, which may be employed in the arrangement of Figure 2. In addition, it should be understood that the present invention is applicable to both pulse type magnetic amplifiers, wherein the frequencies of both the power source and of the input signal are substantially the same; and to carrier type magnetic amplifiers wherein the frequency of the power source is relatively high in comparison with that of the signal input.

In the particular arrangement shown in Figure 2, the magnetic amplifier comprises a core 20, of magnetic material, having a power or output winding 21 and a signal or input winding 22 thereon. The signal winding 22 in effect replaces the load impedance Z shown in Figure 1. The power winding 21 is coupled at one of its ends to a source 23 of regularly occurring power pulses and the other end of the said power or output winding 21 is coupled to an output point 24 whereby outputs may be selectively taken across a load RL.

The core 20 may preferably, but not necessarily, comprise a material exhibiting a substantially rectangular hysteresis loop and materials of this type are well known in the art. Referring to Figure 4, it will be noted that cores comprising such materials normally exhibit several significant points of operation, namely, point 50 (+B*r*) which represents a point of plus remanence; the point 51 (+B*s*) which represents plus saturation; the point 52 (−B*r*) which represents minus remanence; the point 53 (−B*s*) which represents minus saturation; the point 54 which represents the beginning of the plus saturation region; and the point 55 which represents the beginning of the minus saturation region. Discussing brefly the operation of a device utilizing a core which exhibits a hysteresis loop of the type shown in Figure 4, let us assume that a coil is wound on the said core. If we should initially assume that the said core is at an operating point 50 (plus remanence) and if a voltage pulse is applied to the coil which produces in the said coil a current creating a magnetomotive force in a direction tending to increase the flux in the said core (i. e. in a direction of +H), the core will tend to be driven from its operating point 50 (+B*r*) to operating point 51 (+B*s*). During this state of operation there is relatively little flux change through the said coil and the coil therefore presents a relatively low impedance whereby energy fed thereto during this state of operation will pass readily through the said coil and may be utilized to effect a usable output.

On the other hand, if the coil should initially be at a point 52 (−B*r*) prior to the application of the said +H pulse, upon application of such a pulse, the core will tend to be driven from the said point 52 (−B*r*) to the region of plus saturation. The pulse magnitude should preferably be so selected that the core is driven only to the beginning of the plus saturation region, namely, to point 54. During this particular state of operation there is a very large flux change through the said coil and the coil therefore exhibits a relatively high impedance to the applied pulse. As a result, substantially all the energy applied to the coil, when the core is initially at −B*r*, will be expended in flipping the core from point 52 to the region of plus saturation (preferably to point 54) and thence to point 50, with very little of this energy actually passing through the said coil to give a usable output. Thus, depending upon whether the core 20 is initially at its operating point 50 (+B*r*) or at its operating point 52 (−B*r*), an applied power pulse from the source 23 in a +H direction will be presented respectively with either a low impedance or a high impedance and will effect either a relatively large output or a relatively small output.

The foregoing principles are employed, as has been discussed in the prior copending applications identified previously, in the provision of magnetic amplifiers of both the complementing and non-complementing type. In this respect it should be noted that a complementing amplifier is one which will produce outputs in the absence of an input thereto, or, on the other hand, one which will produce no output when an input is presented thereto. A non-complementing magnetic amplifier, however, is one which will produce an output only when an input has been presented thereto.

Returning to the showing of Figure 2, it will be noted that the magnetic amplifier 20—21—22 may be considered to represent, for instance, one of the complementing type. If we should initially assume that the core 20 is at its +B*r* operating point 50, the application of successive positive going power pulses to the power winding 21, from the source 23, will therefore cause the core 20 to be driven from its operating point 50 to its plus saturation operating point 51 during the application of each of said power pulses. Since this particular state of operation is representative of a low impedance state for the output coil 21, an output pulse will appear at the terminal 24 for each of the applied power pulses. If, however, a signal input should be applied to the coil 22 between selected ones of said applied power pulses, the said signal input will subject core 20 to a −H magnetizing force whereby the said core 20 will be driven from its plus remanence operating point 50 to the point 55 and thence to its minus remanence operating point 52 preparatory to the reception of the next positive going power pulse from source 23. The said next positive going power pulse will therefore not produce an output at the point 24. Thus, when the quarter adder of Figure 2 employs a complementing magnetic amplifier of the type shown, the application of an input pulse to one only of the Input A or Input B terminals 10 and 11, between selected ones of the power pulses applied from source 23, will prevent an output pulse from appearing at output terminal 24 during the next succeeding positive going power pulse. The simultaneous presence or absence of input pulses at the terminals 10 and 11, however, will not prevent an output pulse from appearing at 24; therefore, in effect, an output corresponding to the complement of a binary digital quarter addition is obtained.

The arrangement of Figure 2 may also be modified to achieve non-complementing action rather than the complementing action described above. Such a modification may be effected by making use of an opposite polarity of amplifier output to that described above, i. e. by reversing the output diode connected to the lower end of winding 21, reversing the winding direction of power winding 21, and by reversing the phase of the applied power pulses while also effecting a positive shift, equal to the output amplitude, in the D. C. level of the power pulses applied. This technique has been described in the copending applications identified above.

The foregoing considerations may also be employed in the provision of a transformer type quarter adder (see Figure 3) and in such an arrangement the load impedance Z of Figure 1 may comprise a primary winding 30 of a pulse transformer T. The presence of one only of the Input A or Input B signals will effect a resultant signal current through the said primary 30 whereby a voltage will be induced in the secondary 31 of the said transformer T which voltage may be utilized to effect an output signal across a load resistor RL. The simultaneous presence or absence of signals at the said Input A and Input B terminals 10 and 11 will, however, effect no resultant signal current through the primary winding 30 whereby no output will appear across resistor RL. Once more, therefore, the device acts as a quarter adder.

It should be noted that, in the arrangements of Figures 2 and 3, the source 14 of blocking potential has not been utilized. In the arrangement of Figure 3, in addition, the resistor R4 has not been employed. The operation of the devices of Figures 2 and 3 is substantially the same as has been discussed in reference to Figure 1, however, and it should be understood that the several embodiments discussed may be interchanged as desired, and that sources of blocking potentials may be used in Figures 2 and 3 if desired. Still further modifications will be suggested to those skilled in the art in accordance with the principles set forth, and all such variations are intended to fall within the scope of the present invention as set forth in the appended claims.

Having thus described my invention, I claim:

1. A quarter adder comprising first and second input terminals, means selectively coupling signals to said input terminals, a load impedance, means coupling each of said first and second input terminals to one end of said load impedance whereby a signal at either of said terminals will change the potential in a predetermined sense at said one end of said load impedance, a permissive gate having two inputs and an output, means respectively coupling said first and second input terminals to said gate inputs, said gate being operative to produce an output signal of said predetermined sense upon joint application of signals to said first and second input terminals, and means coupling the output signal of said gate to the other end of said load impedance whereby simultaneous signals at said first and second input terminals will cause the potential at each end of said impedance to change in a like polarity sense.

2. A quarter adder comprising first and second input terminals, means selectively coupling signals to each of said terminals, an impedance, means coupling each of said terminals to one end of said impedance whereby a signal at either of said input terminals will change the potential at said one end of said impedance, means responsive to simultaneous signals at said input terminals for effecting a further signal, and means coupling said further signal to the other end of said impedance whereby simultaneous signals at said input terminals will cause the potential at each end of said impedance to change in a like manner.

3. The quarter adder of claim 2 wherein said impedance comprises the primary winding of a pulse transformer.

4. The quarter adder of claim 2 including a magnetic amplifier having a core of magnetic material, said impedance comprising an input coil on said core.

5. The quarter adder of claim 4 wherein said magnetic amplifier is a complementing magnetic amplifier.

6. The quarter adder of claim 4 wherein said magnetic amplifier is a non-complementing magnetic amplifier.

7. The quarter adder of claim 4 in which said core comprises a magnetic material exhibiting a substantially rectangular hysteresis loop.

8. The quarter adder of claim 2 including clamping means coupled to said other end of said impedance, whereby said other end of said impedance will be maintained at a predetermined potential in the absence of simultaneous signals at said input terminals.

9. The quarter adder of claim 2 wherein said means responsive to simultaneous signals at said input terminals comprises a gate circuit, said gate circuit including a pair of diodes having their anodes coupled together, a first resistor coupled between said common anode connection and a source of positive potential, second and third resistors coupled respectively between the cathodes of said diodes and a source of negative potential, said first and second input terminals being coupled respectively to the cathodes of said pair of diodes, and a clamp diode coupled between said common anode connection and a point of ground potential.

10. The quarter adder of claim 9 in which said means coupling said further signal comprises a buffer interposed between said common anode connection of said pair of diodes and said other end of said impedance.

11. A quarter adder comprising first and second input terminals, means selectively coupling input signals to said input terminals, an impedance, first means coupling each of said input terminals to one end of said impedance whereby an input signal at either of said terminals effects a signal of predetermined polarity at said one end of said impedance, control means coupled to said input terminals and including means effecting an output signal of said predetermined polarity in response to a coincident application of signals at said first and second input terminals, and second means coupling the output of said control means to the other end of said impedance whereby signals of the same polarity are coupled to both ends of said impedance in response to coincident application of signals to said input terminals.

12. The quarter adder of claim 11 wherein said first means comprises buffer means interposed between each of said input terminals and said one end of said impedance.

13. The quarter adder of claim 12 including a source of blocking potential selectively coupled to said other end of said impedance.

14. The quarter adder of claim 11 wherein said control means comprises a pair of diodes having their anodes coupled together, a first resistor coupled between said common anode connection and a source of positive potential, and second and third resistors coupled respectively between the cathodes of said diodes and a source of negative potential, said first and second input terminals being coupled respectively to the cathodes of said pair of diodes.

15. The quarter adder of claim 14 in which said second means comprises a buffer interposed between the said common anode connection of said diodes and the said other end of said impedance.

16. The quarter adder of claim 11 in which said impedance comprises a control winding for a magnetic amplifier device.

17. The quarter adder of claim 11 in which said impedance comprises the primary winding of a pulse transformer.

References Cited in the file of this patent

UNITED STATES PATENTS

| | | |
|---|---|---|
| 2,646,501 | Eckert et al. | July 21, 1953 |
| 2,712,065 | Elbourn et al. | June 28, 1955 |
| 2,785,305 | Crooks et al. | Mar. 12, 1957 |